United States Patent
Joshi et al.

(10) Patent No.: US 8,170,857 B2
(45) Date of Patent: May 1, 2012

(54) IN-SITU DESIGN METHOD AND SYSTEM FOR IMPROVED MEMORY YIELD

(75) Inventors: Rajiv V. Joshi, Yorktown Heights, NY (US); Rouwaida Kanj, Round Rock, TX (US)

(73) Assignee: International Business Machines Corporation, Armonk, NY (US)

(*) Notice: Subject to any disclaimer, the term of this patent is extended or adjusted under 35 U.S.C. 154(b) by 627 days.

(21) Appl. No.: 12/324,170

(22) Filed: Nov. 26, 2008

(65) Prior Publication Data

US 2010/0131259 A1    May 27, 2010

(51) Int. Cl.
*G06F 17/50* (2006.01)
(52) U.S. Cl. .......................................... 703/14
(58) Field of Classification Search ............... 703/2, 13, 703/14; 365/201
See application file for complete search history.

(56) References Cited

U.S. PATENT DOCUMENTS

| | | | |
|---|---|---|---|
| 6,014,332 A | 1/2000 | Roohparvar | |
| 6,119,250 A * | 9/2000 | Nishimura et al. | 714/718 |
| 6,400,624 B1 | 6/2002 | Parker et al. | |
| 6,952,623 B2 | 10/2005 | McAdams et al. | |
| 6,957,404 B2 * | 10/2005 | Geist et al. | 716/103 |
| 7,113,422 B2 | 9/2006 | Theel | |
| 7,380,225 B2 | 5/2008 | Joshi et al. | |
| 7,426,668 B2 * | 9/2008 | Mukherjee et al. | 714/733 |
| 7,487,474 B2 * | 2/2009 | Ciplickas et al. | 716/135 |
| 7,665,005 B2 * | 2/2010 | Szydlowski | 714/745 |
| 7,694,256 B1 * | 4/2010 | Galloway et al. | 716/124 |
| 7,788,614 B1 * | 8/2010 | Galloway et al. | 716/113 |
| 7,788,625 B1 * | 8/2010 | Donlin et al. | 716/109 |
| 7,906,254 B2 * | 3/2011 | Pileggi et al. | 430/5 |
| 2005/0273308 A1 * | 12/2005 | Houston | 703/14 |
| 2006/0101355 A1 * | 5/2006 | Ciplickas et al. | 716/2 |
| 2006/0146622 A1 * | 7/2006 | Mukherjee et al. | 365/201 |
| 2006/0203581 A1 | 9/2006 | Joshi et al. | |
| 2007/0133303 A1 | 6/2007 | Mawatari et al. | |
| 2007/0156379 A1 * | 7/2007 | Kulkarni et al. | 703/14 |
| 2007/0288219 A1 * | 12/2007 | Zafar et al. | 703/14 |
| 2008/0005707 A1 * | 1/2008 | Papanikolaou et al. | 716/4 |
| 2008/0059231 A1 | 3/2008 | Dang | |
| 2008/0082881 A1 | 4/2008 | Szydlowski | |
| 2008/0117702 A1 | 5/2008 | Henry et al. | |
| 2008/0319717 A1 * | 12/2008 | Joshi et al. | 703/1 |

OTHER PUBLICATIONS

Tarim et al, T.B. Statistical Design Techniques for Yield Enhancement of Low Voltage CMOS VLSI, Proceedings of the 1998 IEEE International Symposium on Circuits and Systems, 1998, pp. 331-334.*

(Continued)

*Primary Examiner* — Russell Frejd
(74) *Attorney, Agent, or Firm* — Tutunjian & Bitetto, P.C.; Preston J. Young, Esq.

(57) ABSTRACT

A system and method for designing integrated circuits includes determining a target memory module for evaluation and improvement by evaluating performance variables of the memory module. The performance variables are statistically simulated over subset combinations of variables based on pin information for the module. Sensitivities of performance on yield to the variables in the subset combinations are determined. It is then determined whether yield of the target module is acceptable, and if the yield is not acceptable, a design which includes the target module is adjusted in accordance with the sensitivities to adjust the yield.

25 Claims, 6 Drawing Sheets

OTHER PUBLICATIONS

Brusamarello, L. Yield Analysis by Error Propagation Using Numerical Derivatives Considering WD and D2D Variations, IEEE Computer Society Annual Symposium on VLSI, 2007, pp. 86-91.*

Mukhopadhyay et al, S. Modeling of Failure Probability and Statistical Design of SRAM Array for Yield Enhancement in Nanoscaled CMOS, IEEE Transactions on Computer-Aided Design of Integrated Circuits and Systems, vol. 24, No. 12, Dec. 2005, pp. 1859-1880.*

Mukhopadhyay et al, S. Statistical Design and Optimization of SRAM Cell for Yield Enhancement, IEEE/ACM International Conference on Computer Aided Design, 2004, pp. 10-13.*

Mukhopadhyay et al., S. Modeling and Estimation of Failure Probability Due to Parameter Variations in Nano-scale SRAMs for Yield Enhancement, 2004 Symposium on VLSI Circuits, 2004, pp. 64-67.*

* cited by examiner

IN-SITU DESIGN METHOD AND SYSTEM FOR IMPROVED MEMORY YIELD

BACKGROUND

1. Technical Field

The present invention relates to adaptive design methods and systems, and more particularly to systems and methods for altering designs based on in-situ information obtained during fabrication or during design.

2. Description of the Related Art

As technology scales, memory speed and other performance factors form critical limitations for today's processing systems. Particularly, process variations can impact memory devices and mismatches between neighboring devices of a memory cell can lead to memory fails. This can impact overall chip yield. Statistical techniques to study stand-alone memory cell yield have been proposed in the prior art. However, in practical designs, memory cells interface a hierarchy of complex peripheral logic units for data to be transferred to and from a processor. Hence, the performance and yield of a memory array is not only impacted by cell intrinsic variations and mismatch but is also a function of the in-situ conditions/designs that interface, control and possibly limit the cell yield or overall memory yield.

A very basic example of the in-situ conditioning of a cell would be a sense amplifier sensing level. A requirement of 100 mV bitline difference can lead to a cumulative yield that is different from a 200 mV bitline difference.

In more complex situations where the sense amplifier itself is subject to variability, such variability is unacceptable. While the previous example may be manageable, more complex situations can face the memory designer when variability analysis involves a peripheral logic cross-section and a memory array resulting in a cumulative non-linear impact on the overall memory stability/yield.

Consider the example of false-read before write phenomena. It is possible that the bit select circuitry can turn on early enough before the write control signals such that a strong SRAM cell, due to process variations, can pull-down the bitlines early. This would trigger a false-read, and wrong data may be latched to peripheral circuitry. This involves measuring a glitch, is dependent on the SRAM cell rare fails and cannot be covered by statistical timing tools. On the other hand, it is also a function of the peripheral logic timing and statistics.

While it is possible to throw the entire cross-section into statistical memory analysis tools, in general, peripheral logic cross-sections are often too large to be handled by those tools. At the same time, it is not feasible for timing analysis tools to account for the memory cell when analyzing a peripheral logic circuit. This is particularly true when the analysis involves stability of memory. Even for timing yield, memory cells are often treated as dummy loading units. Furthermore, memory analysis requires fast statistical techniques that are not supported by existing statistical timing methodologies. Timing tools stop at the array boundary.

Hence, stand-alone cell yield can vary based on in-situ analysis of the memory cell. It is too costly to perform yield analysis on a large memory cross-section using existing memory statistical techniques. A transistor level analysis of full cross-section can be too costly. Statistical timing tools cannot accommodate for memory yield analysis (stability, for example). Furthermore, it is often possible to fall into a situation where the cell designer does not have much information about a final peripheral logic circuit design to begin with.

SUMMARY

A system and method for designing integrated circuits includes determining a target memory module for evaluation and improvement by evaluating performance variables of the memory module. The performance variables are statistically simulating over subset combinations of variables based on pin information for the module. Sensitivities of performance on yield to the variables in the subset combinations are determined. It is then determined whether yield of the target module is acceptable, and if the yield is not acceptable, a design which includes the target module is adjusted in accordance with the sensitivities to adjust the yield.

A system/method for designing a memory chip includes determining a target memory module for evaluation and improvement by evaluating performance variables of the memory module; statistically simulating the performance variables over subset combinations of variables based on pin information for the module by determining signals and combinations of signals on pins of the target module that have a potential impact on yield; determining sensitivities of performance on yield to the variables in the subset combinations by simulating a response to changing a variable or set of variables to determine impact on yield, and finding the sets of variables impacted the most by the simulating; determining a yield for the memory module; determining whether the yield of the target module is acceptable; if the yield is not acceptable, adjusting a design which includes the target module in accordance with the sensitivities to adjust the yield; and repeating the adjusting until an acceptable yield is achieved.

A system and method for improving yield in integrated circuits includes determining performance variables for a target module being evaluated for improvement and statistically simulating the performance variables over subset combinations of pin information for the module. Sensitivities are determined of performance on yield for the variables in the subset combinations. A determination of whether yield of the target module is acceptable is made, and if the yield is not acceptable, a design which includes the target module is adjusted in accordance with the sensitivities.

A system and method for designing integrated circuits includes determining a target memory module (small module) for evaluation and improvement by evaluating performance variables of the memory module. The performance variables are statistically simulated over subset combinations of variables based on a critical in-situ abstraction of pin information for the representative reduced target module. The in-situ pin abstraction is representative of a set of potential large module peripheral circuits to be used in conjunction with the small module. Statistical simulations of the small module are performed in lieu of large module statistical simulations which can be too time consuming and in certain cases infeasible.

Speedup comes from the combination of fast statistical analysis techniques and small module abstractions. Small module pin abstractions capture timing info, load info, pin info, and module boundary info for purposes of statistical analysis that cannot be performed otherwise in statistical timing tools where the memory module is treated as a dummy terminal or where noise and node upset simulations are under consideration for yield purposes. Furthermore, such techniques can enable more accurate yield estimation compared to typical statistical timing methods even when timing models are possible, as they offer fast rare fail probability estimation capabilities for waveform sensitive yields.

Sensitivities of performance on yield to the variables in the subset pin information combinations are determined. It is then determined whether yield of the target module is acceptable, and if the yield is not acceptable, a design which includes the target module is adjusted in accordance with the sensitivities to adjust the yield.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles provide an efficient method, system and computer implementation for modeling and improving memory yield and performance across process variations and environmental conditions. The modeling, in this example, takes into consideration both array and peripheral circuitry. This provides a mechanism for raising the performance of memory arrays beyond present levels/yields while accommodating the fact that a memory array is an inseparable entity from its surrounding circuitry, and that there is a need to capture the impact of design decisions on the memory module. The present principles provide significant savings at runtime.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Circuits as described herein may include integrated circuit chips and their designs. The chip design may be created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., Graphic Data System II (GDSII)) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

Figure 1:
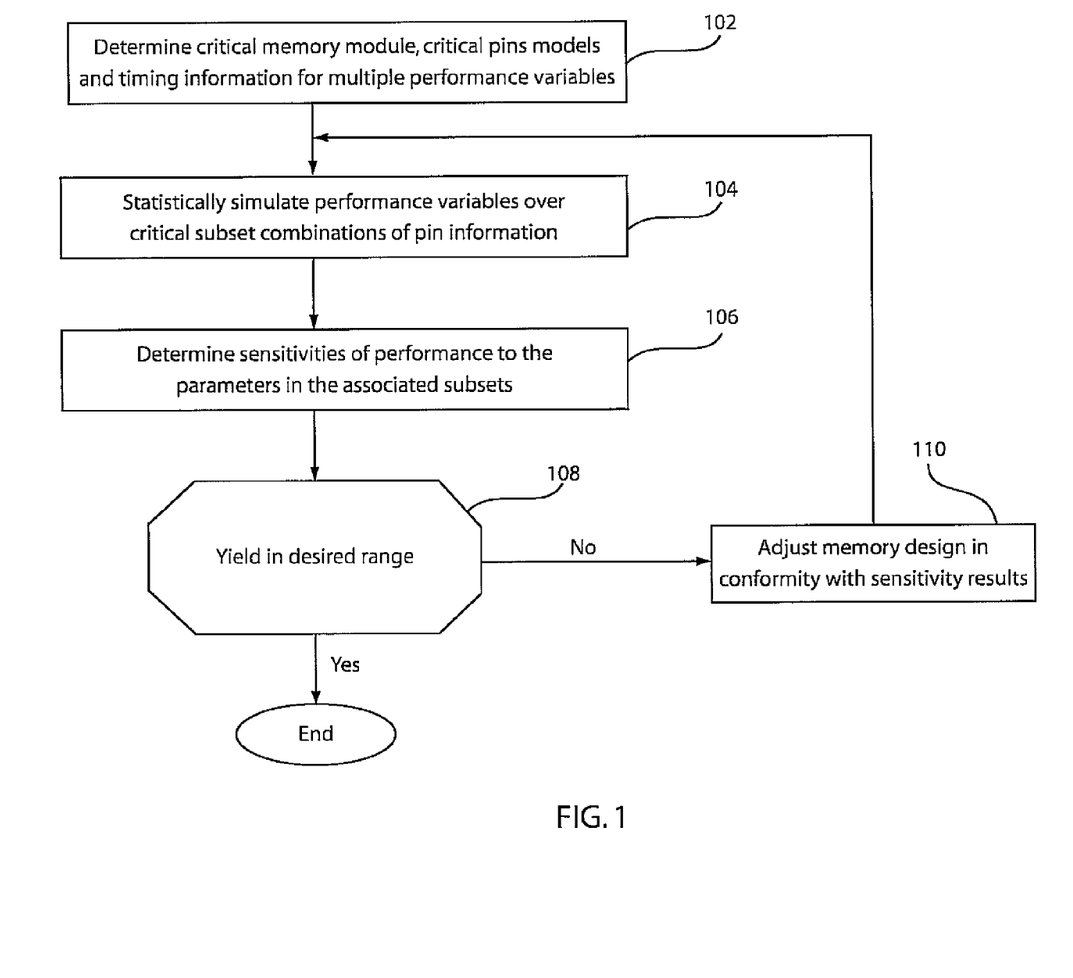
FIG. 1 is a block/flow diagram showing a system/method for improving yield in integrated circuits by making in-situ determinations based on yield sensitivities in accordance with an illustrative embodiment.

Referring now to the drawings in which like numerals represent the same or similar elements and initially to FIG. 1, a block/flow diagram illustratively shows a system/method for accounting for process variations in a design during fabrication of a circuit or chip. In block 102, a module, such as a memory module, logic module, or combination of both, 3-D circuit structures, etc. is targeted for analysis, preferably, in a fast statistical memory analysis tool. The analysis tool used to evaluate the modules in the design may include fast statistical analysis techniques, e.g., see U.S. Pat. No. 7,380,225, incorporated herein by reference.

In block 102, we identify a module (in particular a module important to the design) for a certain phenomena (e.g., timing synchronization or other parameters as will be described) or a performance metric under study. The module represents a small portion of the original full design. The module is considered satisfactory for the study on condition that the interface between the module and the rest of the design is modeled well. Hence, the module is identified as needing adjustment by employing input and output models such as, critical pin models, timing information for those critical pins that are derived from abstracting in-situ information of the module within the full design, peripheral modeling and abstraction: such as loading effect distributions, IR drop modeling, for example, on supply pins, stacking effect modeling (e.g. due to footer, virtual ground), etc. All these models when captured accurately can help reproduce the memory module's behavior and yield as part of a larger full design in the presence of process variation, random and systematic, both in the module and external to the module. Also the models can help bound the behavior if boundary information is available about the module's peripheral circuits during incomplete design stages.

In a particularly useful embodiment, for a given set of performance variables, a critical subset of pin information for a critical cross-section boundary is identified that is suitable to model a larger cross-section (i.e., real memory within chip) and capture the in-situ behavior of the memory design due to variability in the larger cross-section, for example, a representative module or circuit portion.

Also, the pin models and simulations may include actual test (hardware) data, if available. In this way, the targeted module may be evaluated to determine whether process variations in the fabrication of the module can have a negative impact on the module. Test data can be used to collect module or pin (peripheral circuit) information and hence help optimize the existing design or project data for future designs and technologies. The pin information can be obtained from peripheral modeling using existing tools like parasitic extraction tools, timing tools, etc.

For example, the memory module may be targeted by using predetermined criteria which evaluates the modules likelihood as being influenced by process variations. In one embodiment, the process variations may include impact on the module due to surrounding circuitry designs, input waveform variations due to process variations or other process specific variations that would have an impact on the module. These variations may take the form of signal shape changes, timing changes, magnitudes of currents, voltages or temperatures, doping concentrations or any other variations. The analysis tools may be employed to evaluate module response in accordance with input waveforms, etc. Such waveforms may be impacted by the process variations. For example, say a memory layer material deposited in accordance with a deposition process is within specifications but is on the low side of the specified tolerances. This variation may impact the completed memory cell performance. This variation should be accounted for in the circuits that read and write to the cell and any logic functions that may be dependent thereon.

Note that the impact of this variation for a given read-write circuit needs to be studied, as well as the impact of variations in the read/write circuit in terms of, e.g., pulse-width variation, which should be accounted for in the presence of this deposition variation and the combined effect on module/design performance and yield. Also, the study determines the read and write margin of the cell. Once the cell response is characterized, sensitivities to these process variations can be determined as will be explained hereinafter.

Timing information with respect to a memory cell not only involves traditional arrival time and slew as is the case with traditional timing analysis. Rather, it involves signal behavior like statistical (distributions) of signal pulse width, trailing edge and leading edge information. All of this is important for determining memory yield and frequency-limited chip yield. Yield computation methods may be selected based upon the parameters, the design or other criteria.

The signal behavior information can be derived from, e.g., statistical timing analysis of logic periphery, hardware characterization of pin arrival time or pulse width (discrete binning or any form of modeling), or even projections from older technologies of the expected pin arrival time/delays and pulse width/frequency information based on estimated timing coefficients for design migration to a new technology. Pin dependency on environmental variables (e.g., pulse width distributions dependence on temperature, supply voltage, etc.) can be parametrized in the form of tables or analytical equations; e.g., pulse width mean as function of Vdd, or any other parametric relationship. Peripheral modeling and abstraction, e.g., loading (distributions) on the pins of the module can be derived from hardware through load capacitance and delay measurements, 3D extraction, any potential simulation tool that can capture variation of loading as a function of shape/loading device variations, corners, etc. Those parasitics can also account for layout-dependent parasitic load variation, scattering effects, grain boundary effects, and can have distributions due to mask, lithographic and other process variations (systematic and random variation (Vt fluctuations, etc).

These data sets or critical pin abstractions may vary as a function of performance metrics which are being studied. It should be noted that not all of the above parameters need to be evaluated and that the design may focus on one or more such parameters, models or data sets to solve the problem.

In block 104, yield analysis is employed on the module. In accordance with one embodiment, a statistical study of the performance/yield over a subset combinations of pin information may be performed. For example, a statistical analysis of the module yield gives a subset of circuit/pin parameter information and is performed for each of several memory performance variables. The selected performance variables are statistically simulated over critical subset combinations of pin information. The statistical simulation may use known statistical simulation methods that are adapted to provide performance outputs for the selected module being studied.

In block 106, sensitivities of each performance variable to predefined circuit parameter/pin information are determined. The performance sensitivities are correlated to yield sensitivities. This may include building yield models by relying on sensitivities to circuit/critical pin parameters. This can involve employing one or more evaluation techniques, such as, for example, a Bounding box approach, sampling the critical pin information using a Monte Carlo technique, relying on fast sampling techniques to build the models, table/grid based yield models (e.g., look up tables), etc. Depending on whether the critical pin data is predefined, it is possible that the data has both a systematic and a random factor. The random factor can then be analyzed at the same level as the module random variables. Hence, it is possible to have hierarchical dependency of the yield on the pin info. The pin info can be used as fixed or random for yield calculations and then varied for the yield sensitivity calculations. This step provides information regarding how sensitive the module's performance or yield is to process variations. These sensitivities can be directly correlated to circuitry outside the model and used to determine the effects of in-situ design or manufacturing variations on a current portion of a device under study.

In block 108, a yield is projected or determined based on a given pin configuration. The yield can be compared to a desired threshold or yield range for a given module or design. If the yield is below the threshold or out of the desired range, the design of the circuit or device is adjusted in block 110.

Adjustments may include the selection of different process steps in manufacturing or in the design stage. For example, based on the sensitivities for the design, adjustment may be made to a sensitive area to counter a low yield number. The sensitivity determination identifies promising prospects for selecting a parameter, a process variable or other variation to have the greatest or desired impact on the yield.

Hence, the memory cell design parameters and/or operating conditions of the memory cells may be adjusted in conformity with the sensitivities, resulting in improved memory yield and/or performance. Once a performance level is attained, the sensitivities can then be used to alter the probability distributions of the performance variables to achieve an even higher yield. This process is iterative until the appropriate yield is achieved.

With the methodology being employed to target larger cross-sections, the targeted abstracted memory module/cross-section can extend beyond memory cells, e.g., it can extend beyond simple SRAM cells, to account for bitline loading, local evaluation circuitry based on the phenomena under study and breakpoints that enable better breakpoint (pin) abstraction/modeling. Furthermore, the memory module can be extended to involve any type of memory cells such as n-transistor (nT) memory cell designs: 8T, 10T, e-DRAM, phase change memory, etc. Regardless of the memory type under study, one goal is to identify the critical memory module that is small enough to permit fast statistical memory analysis in the presence of variable pin information. Also, yield sensitivities need to be determinable. The memory module under study should establish good break points, good abstraction and modeling of the pin or boundary information. i.e., the following two conditions below are preferably maintained. 1) The memory module has good breakpoints (i.e., be able to track parameter changes to performance changes) that can be easily defined based on the case study and that can be accurately modeled; and 2) proper abstraction of bounding pins is needed, e.g. in case of e-DRAM, one transistor cell with a capacitor can be easily analyzed providing input conditions which toggle wordlines (wordline pulsewidths, delays and so on), bitline precharges, etc. and assess the impact of variation in trench capacitances on performance, functionality of the cell, etc.

The present methods target improving memory designs by optimizing a memory module's yield in-situ sensitivity to design considerations external to the memory unit. The yield is improved by modeling memory unit yield sensitivity to pin information (or other information) for a given plurality of performance variables. One or more operating conditions or design variables of the memory cell may be adjusted to improve operational yield for a desired range of critical peripheral constraints. This methodology is useful for memory devices such as SRAM cells and other nT cells and extends beyond memory devices to other circuits and modules. In this way, simulation time is significantly reduced compared to large cross-sections.

Figure 2:
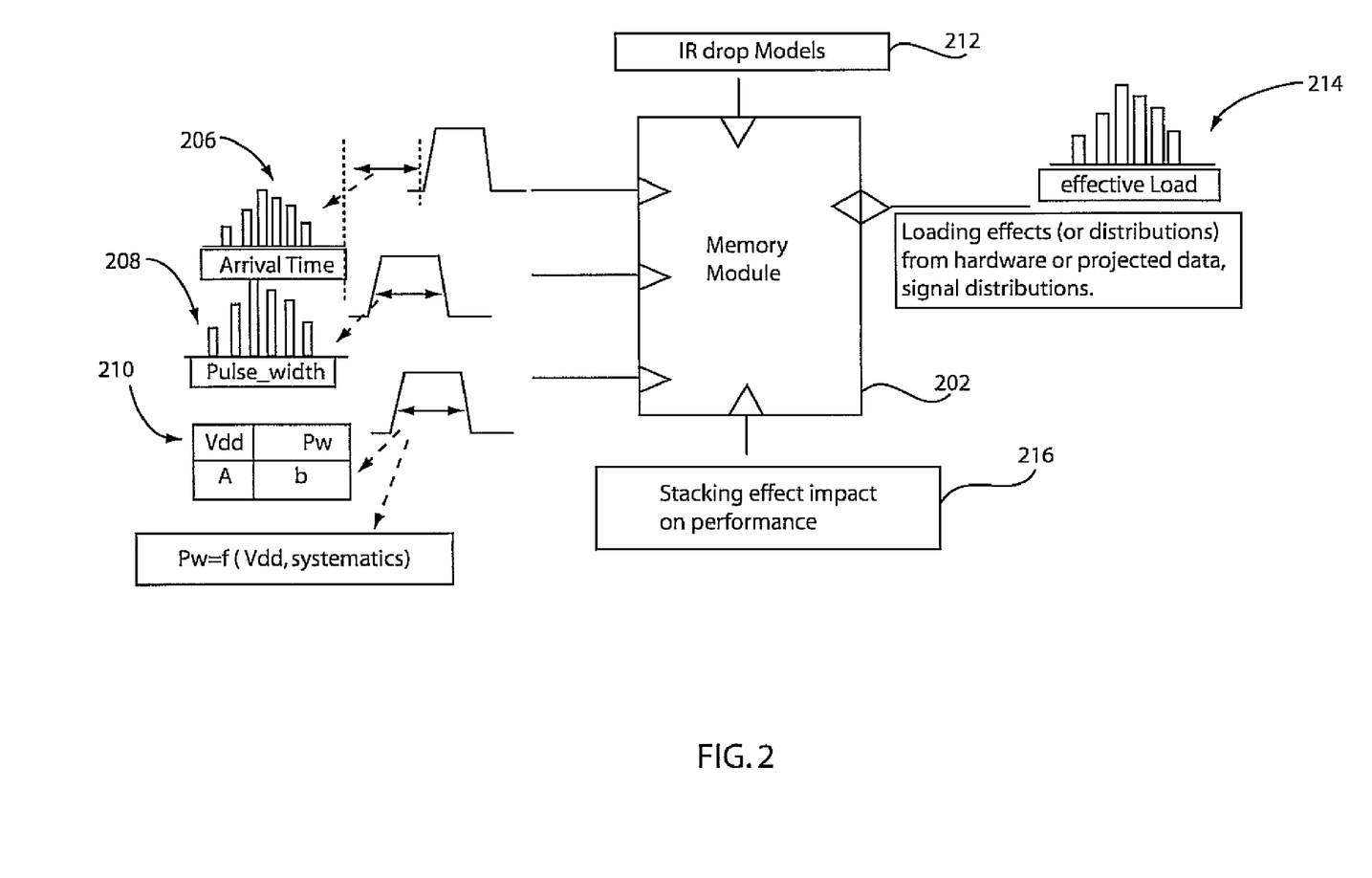
FIG. 2 is a diagram showing a memory module with features including pin models, statistical timing information, hardware considerations, loading and stacking effects, etc.

Referring to FIG. 2, an illustrative diagram of a memory module 202 is employed to demonstrate some of the aspects of the present principles. The memory module 202 includes input/output pins 204 that receive signals from other portions of a same device or chip (or in some cases externally from the device or chip). The pins 204 receive signals that influence the operations on the memory module 202. Aspects of the signal behavior include e.g., arrival times 206, pulse widths 208, conditional or functional controls 210 over these behaviors (e.g., pulsewidth (Pw) as a function of supply voltage (Vdd) or other systematics), models 212 (e.g., IR drop models, etc.), loading effects or distributions (data or hardware) 214, stacking effects 216, and any other property that could effect performance.

The module's (202) response to these inputs may affect its performance. A late arrival on one of the pins 204 may cause improper data to be stored or improper data to be output. Weak or strong (non-nominal) modules due to variability can be more sensitive to such scenarios, and the yield can still be affected even if nominal performance is not affected. The sensitivity of each pin under a plurality of real conditions and signal behaviors, and combinations of signal behaviors on different pins is evaluated to determine areas where adjustments for proper or optimized performance can be made. It is worth mentioning that the optimization can be at the module level, or peripheral level through defining ranges of tolerable pin information for desired yield levels.

Since the complexity of such a problem can grow very rapidly with the number of possibilities, the number of pins, etc., it is preferable to solve the problem statistically to determine ranges of acceptable signal behaviors, and fast statistical techniques can be used. These acceptable signal behaviors will in turn be employed to alter the design of the memory module and/or the peripheral cells or circuits that interface with the memory module 202.

Note that even for fixed pin info, memory module analysis is rare and it is preferred to rely on fast statistical methods to study the yield of the module. Additional pin variability, range and modeling add to the complexity of the problem. The yield analysis and sensitivity can be performed at different levels of complexity and based on the pin info distributions and hierarchy of model complexity.

Figure 3:
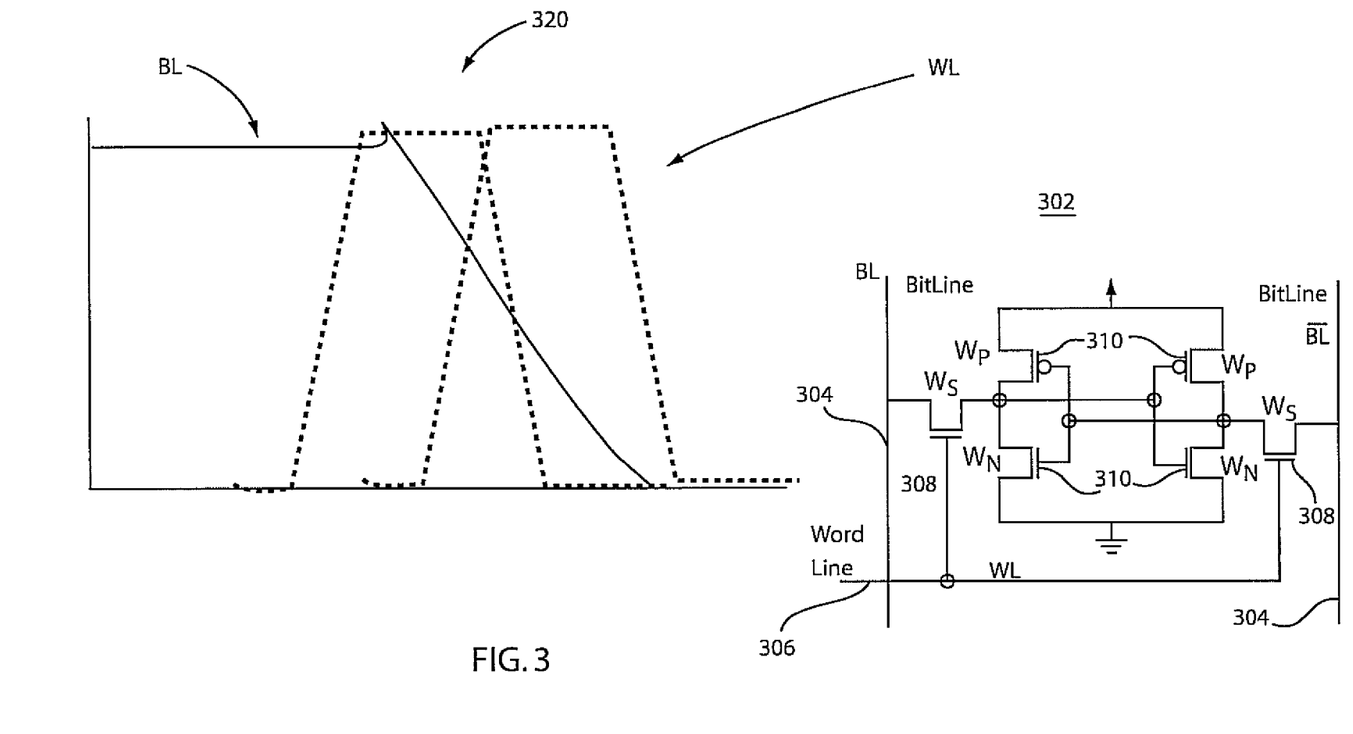
FIG. 3 is a plot and schematic diagram showing an SRAM cell and a graph showing the cell's tolerance for writability yield in accordance with one embodiment.

Referring to FIG. 3, a static random access memory (SRAM) cell 302 is illustratively shown. The SRAM cell 302 includes bitlines 304 and a wordline 306. Access transistors 308 selectively connect bitlines 304 to cross-coupled memory transistors 310 in accordance with a wordline signal. The bitlines are responsive to a data-in during write or data-out during read signal. Therefore, the cell 302 performs in accordance with tolerance of writability yield to the data-in (BL) and wordline signal (WL) arrival times and pulse width distributions illustratively shown in a plot 320. The arrival times of these signals (e.g., data to wordline arrival times) can impact the cell writability. A similar example can be given for other transistor cells, e.g., 8-T (where read and write ports are decoupled: two extra transistors are added).

Note that when studying memory cell yield to account for variables with the proper modeled ranges for a given design, erroneously optimistic yield estimates may be predicted if the periphery through the data line and wordline signals are not modeled well. The cell can be shown optimally for one peripheral circuit design and having low yield for another.

In accordance with one embodiment, the interaction of signal statistics is studied to understand their impact on the yield of the memory cell (or cells) 302. The impact on the yield of the memory cell is considered to define the sensitivities as described above. For example, the signals from the peripheral circuitry of a memory cell can impact the yield or the effectiveness of the memory cells, but the design of the memory cell itself can be adjusted in-situ to handle the variations in the input or control signals. In particularly useful embodiments, bit select circuitry timing can be adjusted (e.g., bitlines can be pulled down early enough to turn on early to account for process variations in the peripheral circuits) to address process variations. Such variations may be addressed in write-control circuitry, e.g., if bit select timing is off the wrong data may be latched to the peripheral circuitry.

In one instance, if a write control signal in a bit-select circuit in a read before write operation is out of synch (early) a node that is supposed to be maintained at or below Vdd/2 may raise above Vdd/2 possibly triggering false latched values. Other process variations can magnify this result. In accordance with the present principles, the memory cell 302 design can be altered to permit variation tolerance to be able to accept consistently early (or consistently late) write control signals. The memory cell or its peripheral circuitry (e.g., bit select circuit) can be modified to build in delay (e.g., 20 ps). The delay may be provided by adding materials, thicknesses to deposited layers, rerouting devices, adding devices, removing devices or any other design alteration. The present principles look at each target module, cell or circuit portions from a more global or even a system perspective to assist in working out interface issues between circuit boundaries and bounding pins for modules.

Figure 4:
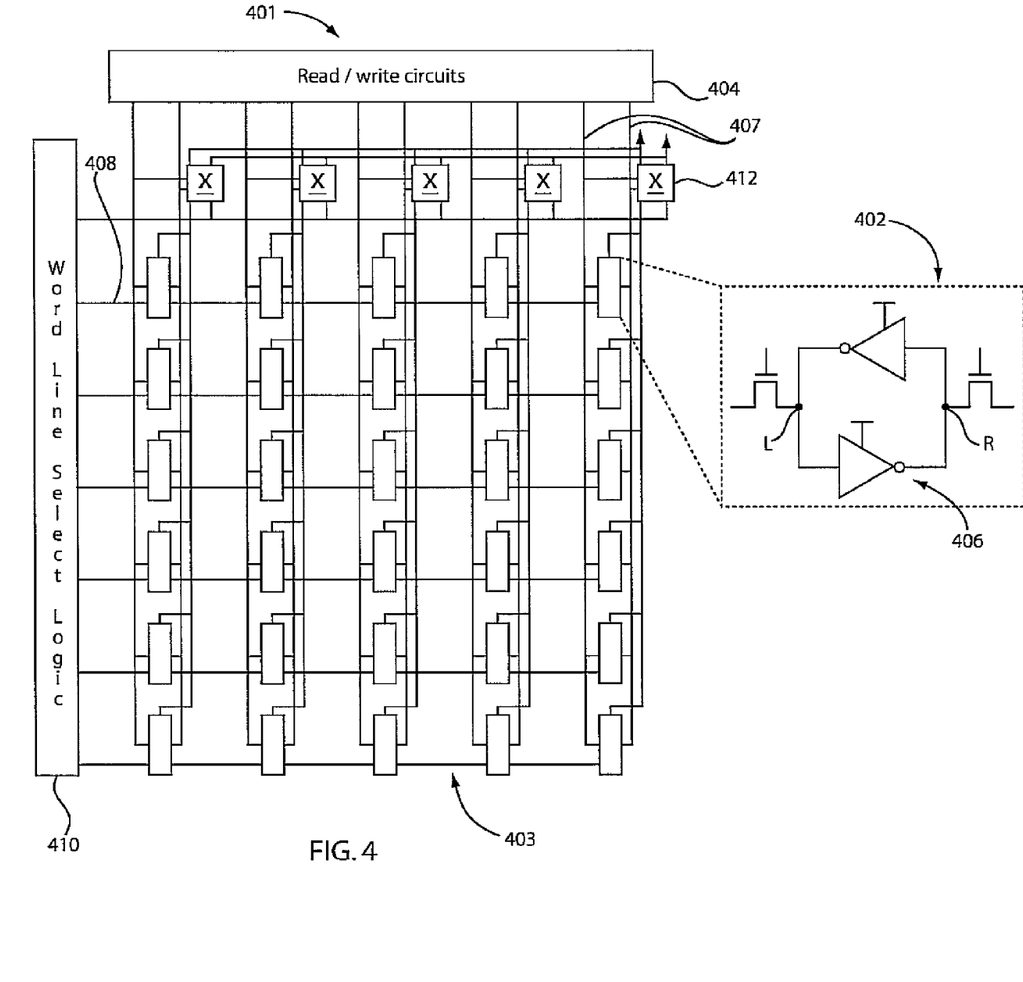
FIG. 4 is a schematic diagram showing a memory device having a critical module selected for analysis in accordance with one illustrative embodiment.

Referring to FIG. 4, a memory cross-section 401 is illustrated including a memory bank 403 together with the peripheral read/write logic circuitry 404 and local evaluation circuits 412. The cross-section 401 will be represented for analysis by a control module 402, which in this case includes an SRAM cell 406. In state-of-the art products, the cross-section may be modeled with few thousand transistors, and would be exhaustive to analyze statistically. In accordance with the present methodology and the flow of FIG. 1, we can obtain a more efficient yet accurate analysis of the module 401 as discussed in the following embodiments. First, a critical reduced memory module 402 is determined. The module satisfies the following: the performance metric under study usually relates to the status of a given circuit node. Hence, the module 402 includes a node and transistors surrounding the node, particularly those in the same channel connected component, and can vary based on the performance metric(s) under study. The module 402 also includes transistors subject to variation whose effects cannot be otherwise abstracted in the form of input/output pin information to the module 402.

In the embodiment of FIG. 4, for the writability performance metric, the critical nodes are the cell internal nodes R and L. Furthermore, the SRAM cell 406 transistors are subject to random process variation effects like random dopant fluctuations. The module 402 includes at least an SRAM cell 406. Enough information can be gathered regarding the SRAM cell boundary and hence it is feasible to determine that the cross-section 401 in this scenario at most extends up to the SRAM cell boundary. This is determined by the fact that it is possible to abstract the wordline pin pulse-width (frequency) timing information from traditional timing analysis or hardware measurements of test chips. It is also possible to obtain the dataline (bitlines 407) pin leading edge trailing edge information from timing analysis of the circuit or from hardware measurements. Also, it is possible to model the loading on bitlines in terms of deterministic or statistical distributions or ranges again from knowledge of the architecture of the bank 403 and single cell information or other electrical measurements.

This information is sufficient to abstract critical pins of the SRAM cell and allows for a module selection as small as the SRAM cell 406. In general, the criteria of pin boundary selection of the memory module in more complex situations can be determined based on user input that identifies break points where data can be collected with ease from other simulation tools or hardware measurements, and is selected to enable simplest cross-section and least number of boundary conditions or variables.

In accordance with FIG. 1 with continued reference to FIG. 4, statistical simulation is then performed for the corresponding performance metric, in this case writability, over the specified abstracted pin information. For example, it is possible that the pin information states that a wordline 408 can vary over a pulse-width window range of 1 ns to 2 ns. This corresponds to a yield window of 3 to 5.5 sigma (sigma being a standard deviation).

The sensitivities of the yield in accordance with block 106 of FIG. 1 are determined, for example, as 2.5 sigma per ns, and the proper design window is identified in the neighborhood of 2 ns for the specific peripheral circuit/cell combination. If there is desire to optimize the cell or redesign the peripheral circuitry (e.g., word line select logic 410 or read/write circuits 404), this yield sensitivity study information along with other performance metric studies are taken into consideration.

Figure 5:
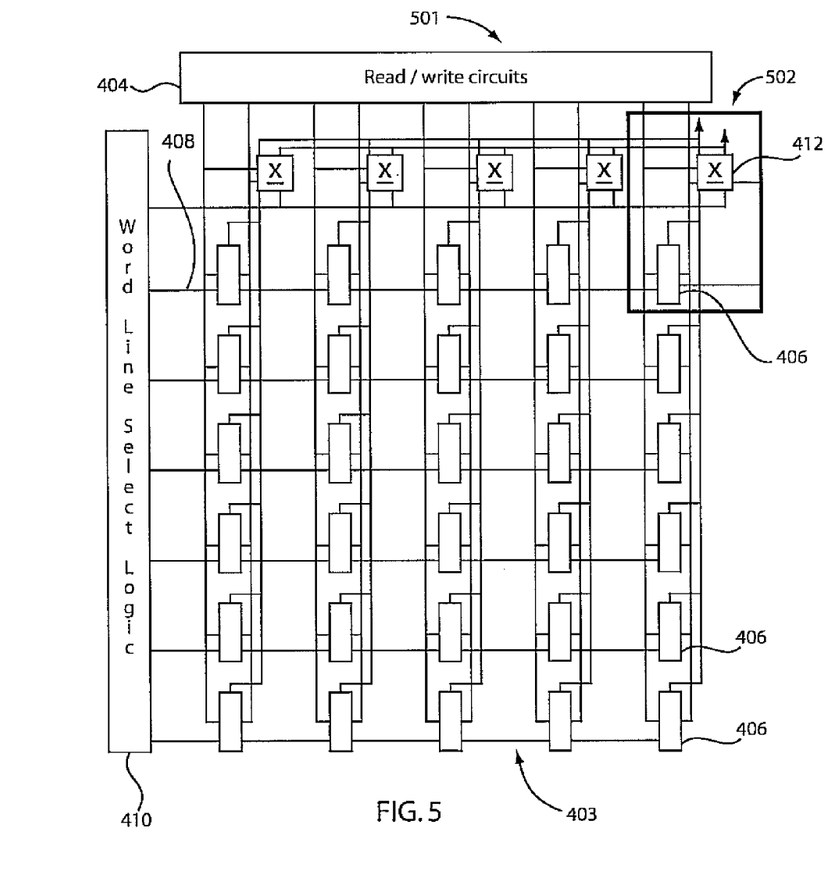
FIG. 5 is a schematic diagram showing a memory device having a more complex critical module selected for analysis including additional considerations in accordance with one illustrative embodiment.

Referring to FIG. 5, a more complex critical memory module 502 is represented for a memory circuit 501. Fast read before write can involve glitches on the local evaluation circuitry 412 that can lead to yield fails. Performance metrics involve a node in the local evaluation circuit 412 (see node A3 in FIG. 6). Hence, the module 502 needs to include the local evaluation circuit 412. Also, the module 502 needs to include the SRAM cell 406 because the cell's transistors are subject to threshold voltage variation and need to be included in the statistical analysis. Module 502 in FIG. 5 is a target memory module.

Figure 6:
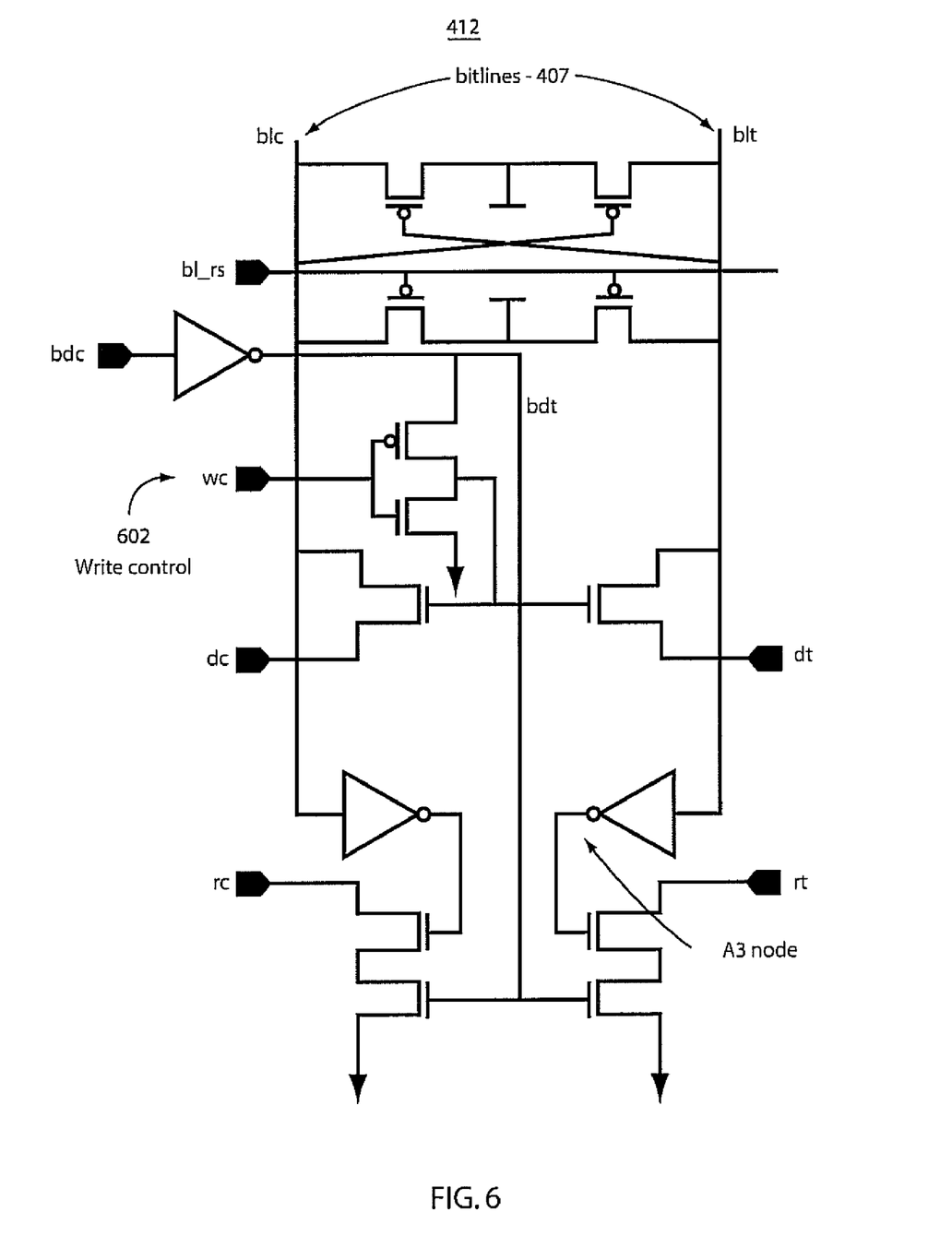
FIG. 6 is a schematic diagram representing a boundary for the local evaluation circuitry whose pins can be modeled properly using timing analysis in accordance with an illustrative embodiment.

Cell wordline and bitline pin information can be modeled as described earlier. FIG. 6 represents the boundary for the local evaluation circuitry 412 whose pins can be modeled properly using timing analysis, e.g. a write control (wc) signal 602. In a similar manner, fast-read-before-write is studied statistically at node A3. Yield sensitivities to wordline, write control signals and other signals (such as bit line reset (bl_rs), or other known signals (e.g., bdc (bit decode complement), bdt (bit decode true), dc (data complement), rc (reset complement), dt (data true), rt (reset true), blc (bitline complement), blt (bitline true), etc.) may be used to determine the cell/peripheral logic compatibility. It is possible that certain pin information varies randomly and this information is lumped in block 104 (FIG. 1) analysis. It is also possible that block 106 not only includes sensitivities but can include Monte Carlo analysis or simply bounding box analysis. Most importantly, yield windows will be determined to test/guide the design stages. All this comes at significant savings in runtime compared to full-blown analysis.

Having described preferred embodiments of an in-situ design method and system for improved memory yield (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for designing integrated circuits, comprising:
   determining a target memory module for evaluation and improvement by evaluating performance variables of the target memory module;
   statistically simulating, by a hardware processor, the performance variables over subset combinations of variables based on pin information for the target memory module, wherein the variables in the subset combinations include variables that symbolize external signals applied to the target memory module via at least one pin in the target memory module;
   determining sensitivities of yield to the variables in the subset combinations by varying the variables that symbolize external signals;
   determining whether yield of the target memory module is acceptable; and
   if the yield is not acceptable, adjusting a design which includes the target memory module in accordance with the sensitivities to adjust the yield.

2. The method as recited in claim 1, wherein evaluating performance variables includes determining at least one of critical pin models, timing information, pulse width distributions, trailing edge, leading edge information, loading or stacking effects for the target memory module and peripheral modules that effect the target memory module.

3. The method as recited in claim 1, wherein statistically simulating includes determining signals and combinations of signals on pins of the target memory module that have a potential impact on the yield.

4. The method as recited in claim 1, wherein determining sensitivities of performance on yield includes:
   simulating a response to changing a variable or set of variables to determine impact on yield; and
   finding the sets of variables impacted the most by the simulating.

5. The method as recited in claim 1, wherein determining sensitivities includes building yield models by relying on the sensitivities.

6. The method as recited in claim 5, wherein building yield models by relying on the sensitivities includes employing at least one of a bounding box, Monte Carlo sampling, fast sampling and table or grid models.

7. The method as recited in claim 1, wherein the target memory module includes a memory cell.

8. The method as recited in claim 1, wherein determining whether yield of the target memory module is acceptable includes comparing the yield to a yield range.

9. The method as recited in claim 1, wherein adjusting a design includes changing process parameters during fabrication.

10. The method as recited in claim 1, wherein adjusting a design includes changing design parameters during a design phase.

11. A computer readable storage medium comprising a computer readable program for designing integrated circuits, wherein the computer readable program when executed on a computer causes the computer to:
    determining a target memory module for evaluation and improvement by evaluating performance variables of the target memory module;
    statistically simulating the performance variables over subset combinations of variables based on pin information for the target memory module, wherein the variables in the subset combinations include variables that symbolize external signals applied to the target memory module via at least one pin in the target memory module;
    determining sensitivities of yield to the variables in the subset combinations by varying the variables that symbolize external signals;
    determining whether yield of the target memory module is acceptable; and
    if the yield is not acceptable, adjusting a design which includes the target memory module in accordance with the sensitivities to adjust the yield.

12. The computer readable medium as recited in claim 11, wherein evaluating performance variables includes determining at least one of critical pin models, timing information, pulse width distributions, trailing edge, leading edge information, loading or stacking effects for the target module and peripheral modules that effect the target memory module.

13. The computer readable medium as recited in claim 11, wherein statistically simulating includes determining signals and combinations of signals on pins of the target memory module that have a potential impact on the yield.

14. The computer readable medium as recited in claim 11, wherein determining sensitivities of performance on yield includes:
    simulating a response to changing a variable or set of variables to determine impact on yield; and
    finding the sets of variables impacted the most by the simulating.

15. The computer readable medium as recited in claim 11, wherein determining sensitivities includes building yield models by relying on the sensitivities.

16. The computer readable medium as recited in claim 15, wherein building yield models by relying on the sensitivities includes employing at least one of a bounding box, Monte Carlo sampling, fast sampling and table or grid models.

17. The computer readable medium as recited in claim 11, wherein the target memory module includes a memory cell.

18. The computer readable medium as recited in claim 11, wherein determining whether yield of the target memory module is acceptable includes comparing the yield to a yield range.

19. The computer readable medium as recited in claim 11, wherein adjusting a design includes changing process parameters during fabrication.

20. The computer readable medium as recited in claim 11, wherein adjusting a design includes changing design parameters during a design phase.

21. A method for designing a memory chip, comprising:
    determining a target memory module for evaluation and improvement by evaluating performance variables of the target memory module;
    statistically simulating, by a hardware processor, the performance variables over subset combinations of variables based on pin information for the target memory module by determining signals and combinations of signals on pins of the target memory module that have a potential impact on yield;
    determining sensitivities of performance on yield to the variables in the subset combinations by simulating a response to changing a variable or set of variables to determine impact on yield, and finding the sets of variables impacted the most by the simulating;
    determining a yield for the target memory module;
    determining whether the yield of the target memory module is acceptable;
    if the yield is not acceptable, adjusting a design which includes the target memory module in accordance with the sensitivities to adjust the yield; and
    repeating the adjusting until an acceptable yield is achieved.

22. The method as recited in claim 21, wherein evaluating performance variables includes determining at least one of critical pin models, timing information, pulse width distributions, trailing edge, leading edge information, loading or stacking effects for the target memory module and peripheral modules that effect the target memory module.

23. The method as recited in claim 21, wherein determining sensitivities includes building yield models by relying on the sensitivities.

24. The method as recited in claim 23, wherein building yield models by relying on the sensitivities includes employing at least one of a bounding box, Monte Carlo sampling, fast sampling and table or grid models.

25. The method as recited in claim 21, wherein adjusting a design includes changing process parameters during one of a fabrication process and a design phase.

* * * * *